(12) United States Patent
Hassan et al.

(10) Patent No.: US 8,787,470 B2
(45) Date of Patent: *Jul. 22, 2014

(54) DATA ENCODING (75) Inventors: Amer A. Hassan, Kirkland, WA (US); Jenelle R. Coberly, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,357

(22) Filed: Jul. 13, 2011

(65) Prior Publication Data

US 2011/0268157 A1 Nov. 3, 2011

Related U.S. Application Data (63) Continuation of application No. 11/012,815, filed on Dec. 15, 2004, now Pat. No. 8,014,468.

(51) Int. Cl.
*H04K 1/10* (2006.01)
*H04L 27/28* (2006.01)

(52) U.S. Cl.
USPC ............................................ 375/260; 455/59

(58) Field of Classification Search
None
See application file for complete search history.

(56) References Cited

U.S. PATENT DOCUMENTS

| | | | |
|---|---|---|---|
| 4,539,524 A * | 9/1985 | Goode | 329/300 |
| 4,686,490 A | 8/1987 | Cressey | |
| 5,343,496 A | 8/1994 | Honig et al. | |
| 5,416,726 A | 5/1995 | Garcia-Duarte et al. | |
| 5,544,082 A | 8/1996 | Garcia-Duarte et al. | |
| 5,619,564 A | 4/1997 | Canniff et al. | |
| 5,640,423 A * | 6/1997 | Archer | 375/261 |
| 5,802,305 A | 9/1998 | McKaughan et al. | |
| 5,852,630 A | 12/1998 | Langberg et al. | |
| 5,919,264 A | 7/1999 | Reneris | |
| 5,960,040 A | 9/1999 | Cai et al. | |

(Continued)

FOREIGN PATENT DOCUMENTS

| | | |
|---|---|---|
| CN | 1489852 | 4/2004 |
| CN | 1507713 | 6/2004 |

(Continued)

OTHER PUBLICATIONS

"Advisory Action", U.S. Appl. No. 11/012,815, (Jul. 29, 2009), 3 pages.

(Continued)

*Primary Examiner* — Shuwang Liu
*Assistant Examiner* — Gina McKie
(74) *Attorney, Agent, or Firm* — John Jardine; Andrew Sanders; Micky Minhas (57) ABSTRACT

The receiver portion of a UWB wireless device is altered by replacing analog-to-digital circuitry with a simple energy detection circuit. In embodiments, the coding methodology of a transmitter is altered to support the simplified receiver configuration. For example, instead of coding the data to be sent in the phase of the UWB signal, the data is encoded in a binary fashion in discrete frequency subbands of the UWB signal. Although this may reduce the usable bandwidth of the channel, it also decreases the complexity and power consumption of UWB devices. In one or more embodiments, a UWB device is able to select a transmission mode (BPSK or Energy Coding) based on its environment. Moreover, in one or more embodiments, receiving devices may switch between coding modes based on the capabilities of a remote transmitter and/or a peer receiver.

20 Claims, 12 Drawing Sheets

(56) References Cited

U.S. PATENT DOCUMENTS

| | | | |
|---|---|---|---|
| 5,974,094 | A * | 10/1999 | Fines et al. ............... 375/335 |
| 6,025,758 | A * | 2/2000 | Lu ............................. 332/100 |
| 6,092,208 | A | 7/2000 | Reneris |
| 6,131,130 | A | 10/2000 | Van Ryzin |
| 6,243,821 | B1 | 6/2001 | Reneris |
| 6,289,464 | B1 | 9/2001 | Wecker et al. |
| 6,359,942 | B1 * | 3/2002 | Duggan et al. ............. 375/335 |
| 6,466,634 | B1 | 10/2002 | O'Toole et al. |
| 6,947,893 | B1 | 9/2005 | Iwaki et al. |
| 6,985,531 | B2 * | 1/2006 | McCarty, Jr. .............. 375/244 |
| 7,215,635 | B2 | 5/2007 | Song et al. |
| 7,342,954 | B2 | 3/2008 | Fitton et al. |
| 7,342,973 | B2 | 3/2008 | Walker et al. |
| 8,014,468 | B2 | 9/2011 | Hassan |
| 2002/0080951 | A1 | 6/2002 | Tanrikulu |
| 2002/0122499 | A1 | 9/2002 | Kannan et al. |
| 2002/0167368 | A1 | 11/2002 | Yoshida |
| 2003/0101462 | A1 | 5/2003 | Chung |
| 2003/0198196 | A1 | 10/2003 | Bahl et al. |
| 2003/0203740 | A1 | 10/2003 | Bahl et al. |
| 2003/0210658 | A1 | 11/2003 | Hernandez et al. |
| 2004/0008729 | A1 | 1/2004 | Rogerson et al. |
| 2004/0028011 | A1 | 2/2004 | Gehring et al. |
| 2004/0028012 | A1 | 2/2004 | Walker et al. |
| 2004/0048574 | A1 | 3/2004 | Walker et al. |
| 2004/0218683 | A1 | 11/2004 | Batra et al. |
| 2005/0009547 | A1 * | 1/2005 | Harris et al. ............... 455/509 |
| 2005/0018762 | A1 | 1/2005 | Aiello et al. |
| 2005/0018783 | A1 | 1/2005 | Nakache et al. |
| 2005/0018791 | A1 | 1/2005 | Molisch et al. |
| 2005/0100121 | A1 | 5/2005 | Fouret et al. |
| 2005/0271011 | A1 | 12/2005 | Alemany et al. |
| 2006/0053004 | A1 * | 3/2006 | Ceperkovic et al. ........ 704/221 |
| 2006/0068777 | A1 | 3/2006 | Sadowsky et al. |

FOREIGN PATENT DOCUMENTS

| | | |
|---|---|---|
| EP | 1585229 | 10/2005 |
| JP | 61225994 | 7/1986 |
| JP | 10107696 | 4/1998 |
| JP | 2000324519 | 11/2000 |
| JP | 2005304029 | 10/2005 |
| KR | 1020060045522 | 5/2006 |
| WO | WO-9604740 | 2/1996 |
| WO | WO-0133714 | 5/2001 |

OTHER PUBLICATIONS

"Extended European Search Report", EP Application No. 05112241.4, (Jun. 14, 2010),10 pages.

"Final Office Action", U.S. Appl. No. 11/012,815, (Dec. 23, 2010),23 pages.

"Final Office Action", U.S. Appl. No. 11/012,815, (May 13, 2009),25 pages.

"Foreign Office Action", Chinese Application No. 200510131663.8, (Aug. 15, 2008),20 pages.

"Foreign Office Action", Chinese Application No. 200510131663.8, (May 11, 2011),16 pages.

"Foreign Office Action", EP Application No. 05112241.4, (Dec. 23, 2010),6 pages.

"Foreign Office Action", Japanese Application No. 2005-361989, (Jul. 22, 2011),9 pages.

"Non-Final Office Action", U.S. Appl. No. 11/012,815, (Oct. 29, 2008),23 pages.

"Non-Final Office Action", U.S. Appl. No. 11/012,815, (Nov. 5, 2009),18 pages.

"Non-Final Office Action", U.S. Appl. No. 11/012,815, (Apr. 15, 2008),17 pages.

"Non-Final Office Action", U.S. Appl. No. 11/012,815, (Jul. 14, 2010),20 pages.

"Notice of Allowance", U.S. Appl. No. 11/012,815, (May 20, 2011),14 pages.

"Partial European Search Report", EP Application No. 05112241.1, (Mar. 25, 2010),5 pages.

"Supplemental Notice of Allowance", U.S. Appl. No. 11/012,815, (Jun. 30, 2011),2 pages.

"Supplemental Notice of Allowance", U.S. Appl. No. 11/012,815, (Jul. 20, 2011),2 pages.

"Supplemental Notice of Allowance", U.S. Appl. No. 11/012,815, (Jul. 26, 2011),2 pages.

Honghao, Li "Ad Hoc Network and Its Routing Technologies", *Modern Science & Technology of Telecommunications*, No. 2, 2002, (Feb. 15, 2002),12 pages.

"Foreign Notice of Allowance", Chinese Application No. 200510131663.8, (Nov. 21, 2011), 4 pages.

"Foreign Office Action", Japanese Application No. 2005-361989, (Dec. 22, 2011), 9 pages.

"Foreign Office Action", Korean Application No. 10-2005-0123763, (Dec. 23, 2011), 5 pages.

Kim, Seung H., et al., "Frequency-Hopped Multiple-Access Communications with Multicarrier On-Off Keying in Rayleigh Fading Channels", IEEE Transactions on Communications, vol. 48, No. 10,(Oct. 2000), pp. 1692-1701.

Paquelet, Stephane et al., "An Impulse Radio Asynchronous Transceiver for High Data Rates", Joint UWBST & IWUWBS 2004,(May 18, 2004), 5 pages.

"Foreign Office Action", European Patent Application No. 05112241.4, (Oct. 2, 2012), 5 pages.

"Foreign Office Action", Japanese Application No. 2005-361989, (Jun. 8, 2012),2 pages.

"Foreign Office Action", CN Application No. 20120025659.3, Nov. 25, 2013, 11 pages.

* cited by examiner

DATA ENCODING

RELATED APPLICATION

This application is a continuation of and claims priority to U.S. application Ser. No. 11/012,815, entitled "Energy Detection Receiver for UWB" to Hassan et al., filed Dec. 15, 2004, the disclosure of which is incorporated in its entirety by reference herein.

BACKGROUND

The digital revolution ushered in by widely available computing devices is now well under way, and a secondary wave is now occurring. The secondary wave involves enhanced interconnectivity of the various available computing devices, as users insist upon a more mobile and/or less cluttered experience. For example, a traditional desktop PC can provide a great deal of utility. However the user is tethered in place by the size of the machine as well as its various wired connections.

Today, many handheld and small devices provide substantial computing power to their users, and do so in a wireless manner, thus allowing freedom of movement. For example, cell phones, personal digital assistants, notebook computers and other devices can communicate wirelessly and are portable. For larger devices such as desktop computers, household appliances, and entertainment devices, when mobility is not a concern, wireless connectivity still allows freedom from wire clutter.

However, wireless devices, by the their nature, often lack power cables or other provisions for connecting continuously to an external power source while in use, and thus must be supported by battery power alone. While battery technology has advanced recently and higher capacity batteries are becoming available (for example, Lithium Ion and Lithium Polymer batteries), there is still a continued substantial need to conserve and properly manage energy consumption in battery-powered wireless devices. Moreover, the cost and hence popularity of devices is often directly related to the device's complexity. Accordingly, it is desirable where possible to simplify the construction and operation of wireless devices.

SUMMARY

In embodiments, the receiver portion of UWB wireless device is altered by replacing expensive a power-hungry analog-to-digital circuitry with a simple energy detection circuit. In addition, in embodiments, the coding method of a transmitter is altered to support this simplified receiver. In particular, instead of coding data to be sent in the phase of the UWB signal, the data is encoded in a binary fashion in discrete frequency subbands. Although this may reduce the usable bandwidth of the channel, it also decreases the complexity and power consumption of UWB devices.

In embodiments, a UWB device is able to select a transmission mode based on its environment. Moreover, in further embodiments, receiving devices may switch between coding modes based on the capabilities of a remote transmitter and/or a peer receiver.

Additional features of one or more embodiments will be made apparent from the following detailed description of illustrative embodiments which proceeds with reference to the accompanying figures.

BRIEF DESCRIPTION OF THE DRAWINGS

While the appended claims set forth the features of the claimed embodiments with particularity, implementations are best understood from the following detailed description taken in conjunction with the accompanying drawings, of which:

DETAILED DESCRIPTION

Embodiments will be described herein by reference to the Ultra Wideband (UWB) wireless communication technology, although it will be appreciated that the techniques described herein are useable with respect to devices implementing other communications technologies as well. UWB is sometimes alternatively referred to as impulse, baseband or zero-carrier technology. UWB is a wireless communications technology that transmits very short ultra-low power radio signals across a wide frequency spectrum. UWB receivers can translate the received burst by recognizing a particular pulse sequence sent by the transmitter. The FCC has defined UWB as including any signal that occupies more than 500 MHz or having more than 20% fractional bandwidth, in the 3.1 GHz to 10.6 GHz band. The bandwidth of a UWB signal may be around 25% of the center frequency. For example, a "2 GHz" UWB signal may have a bandwidth of 500 MHz.

The spectrum allowed for UWB is 7500 MHz. This is substantially greater than the spectrum for other technologies in the United States. For example, ISM at 2.4 GHz encompasses an 83.5 MHz spectrum, while U-NI at 5 GHZ takes up 300 MHz (to be increased to 555 MHz). The broad spectrum of UWB allows it to be useful in PC cluster and home cluster scenarios where broadband connectivity is required. For example, a PC cluster may comprise a PC and a storage device and/or an IO device, such as a docking station, and/or a printer or other peripheral, all wirelessly interconnected. In a home cluster, a computer such as a PC or laptop may be wirelessly connected to consumer electronics devices such as a digital camera, video camera, MP3 player, projector, TV, etc., allowing high-speed content transfers. Another potential home cluster environment is within an automobile or other vehicle. Bandwidth requirements for consumer electronic and entertainment applications may be as follows: HDTV, 19 Mbps; DVD player, 10 Mbps; MPEG2, 1-8 Mbps; MPEG1, 1.5 Mbps; Broadband access, 1-10 Mbps; Video Conference, 1-2 Mbps; TV terminal, 2-5 Mbps; Stereo CD player, 1.4 Mbps; Computer Network, 1-10 Mbps; and Telephone, 8-64 kbps.

The modulation technique used for UWB may be binary phase-shift keying (BPSK). In BPSK, each pulse is sent at zero or 180 degrees, i.e., right side up or inverted. Thus, BPSK modulation is efficient in its use of the spectrum, requiring about half the bandwidth of a comparable pulse position modulation system.

Figure 1:
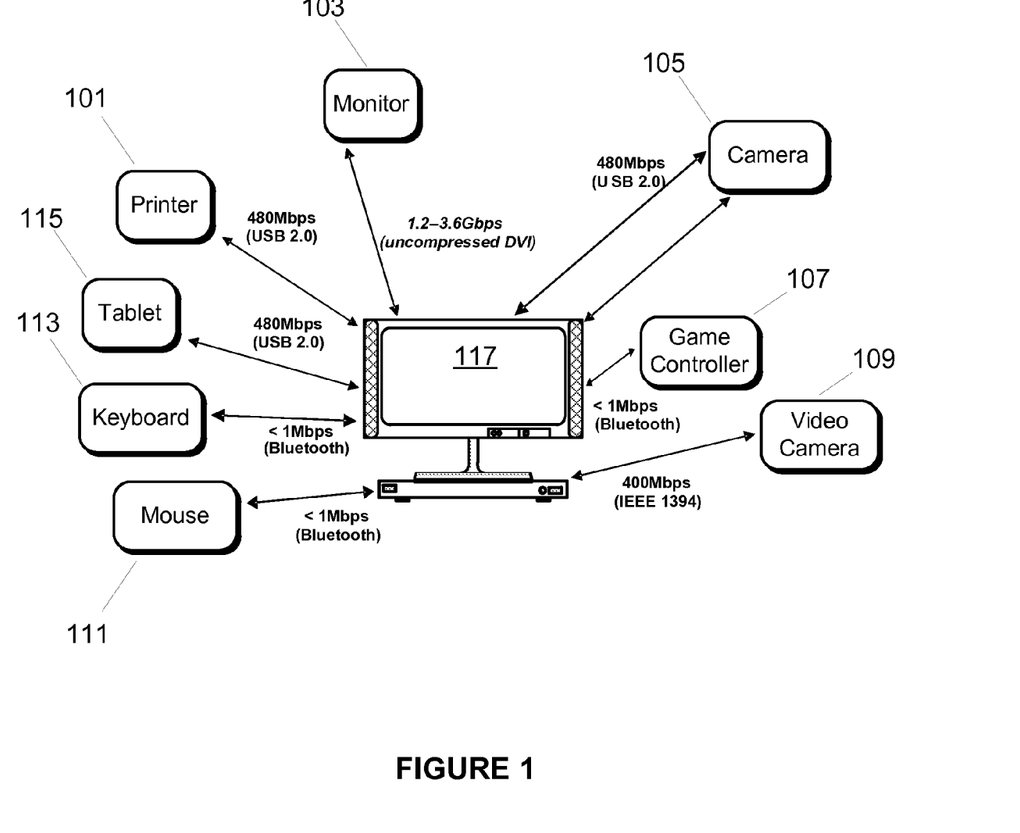
FIG. 1 is a schematic diagram of a wireless desktop device cluster within which embodiments may be implemented.
Figure 2:
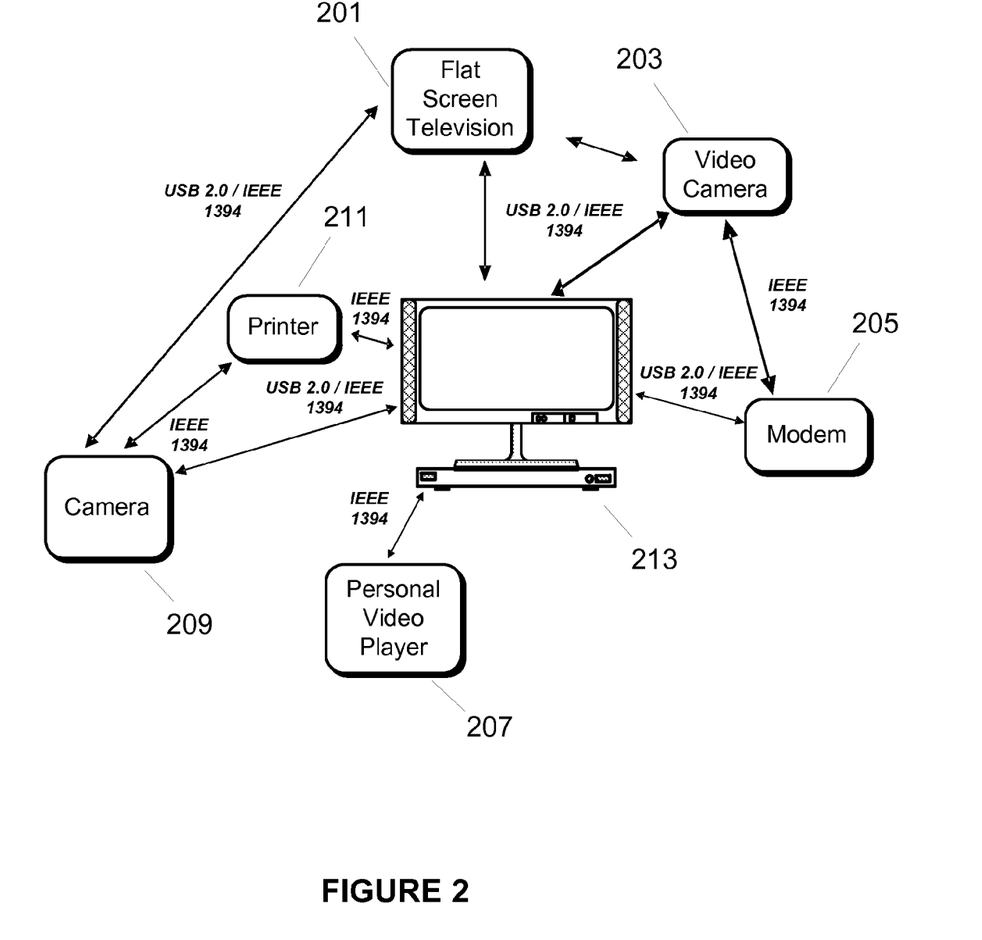
FIG. 2 is a schematic diagram of an ad hoc wireless consumer electronics network within which embodiments may be implemented.
Figure 3:
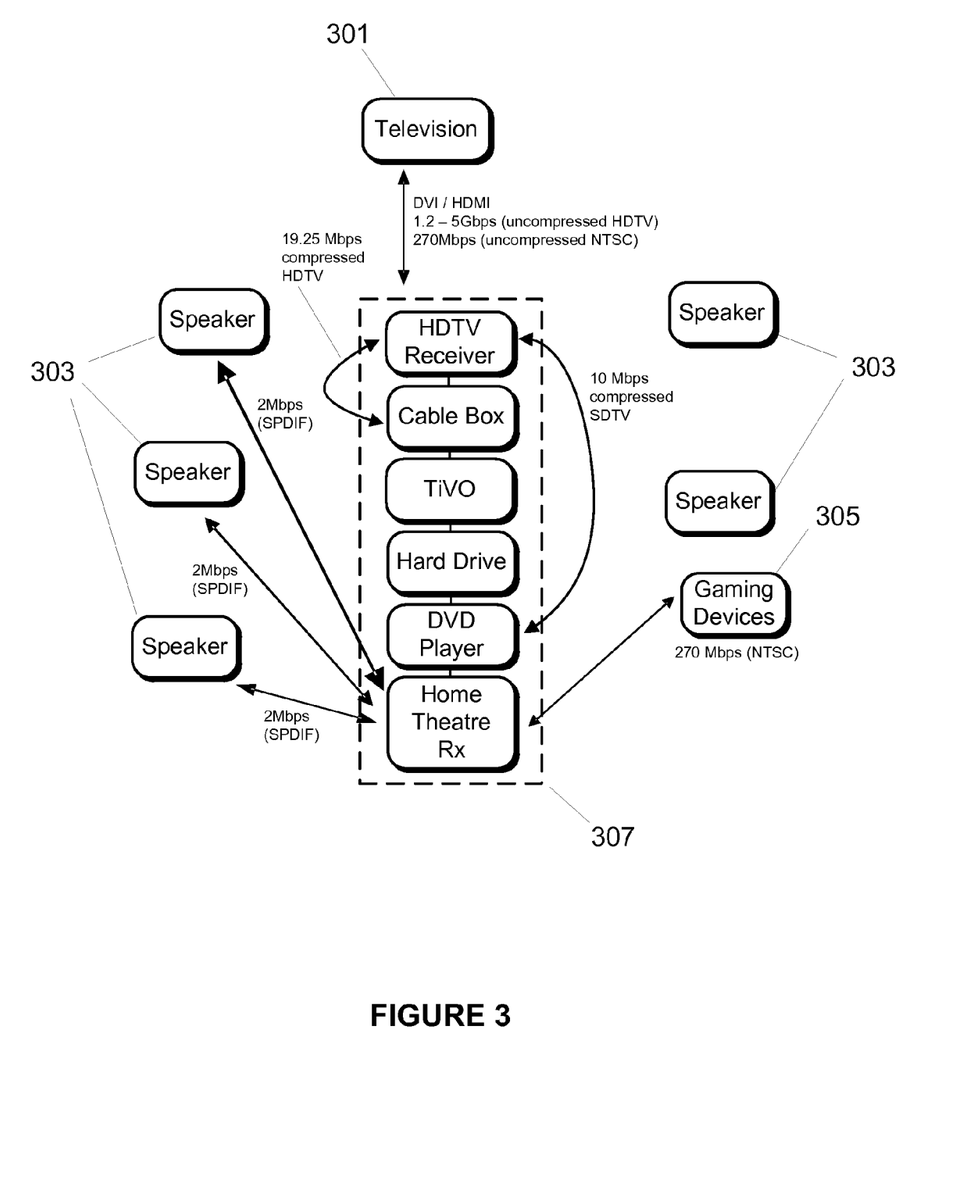
FIG. 3 is a schematic diagram of a wireless home entertainment network within which embodiments may be implemented.

A number of device environments within which embodiments may be used are illustrated in FIGS. 1-3. FIG. 1 shows an exemplary wireless desktop device cluster. Exemplary devices shown include a printer 101, monitor 103, camera 105, game controller 107, video camera 109, mouse 111, keyboard 113, and tablet 115. The various devices communicate wirelessly via a personal computer 117. The wireless protocol of each device need not be the same. For example, a number of protocols are shown including IEEE 1394, USB 2.0, USB 1.0, and Bluetooth.

FIG. 2 illustrates an ad hoc wireless consumer electronics network. The network contains exemplary devices including a flat screen television 201, video camera 203, modem 205, personal video player 207, digital camera 209, and printer 211, as well as a personal computer 213. The various devices are interconnected by a suitable wireless protocol such as IEEE 1394 and/or USB 2.0.

Finally, FIG. 3 illustrates an exemplary wireless home entertainment network. The network includes a number of devices including a television 301, speakers 303, gaming devices 305, and multimedia stack 307. The multimedia stack 307 includes an HDTV receiver, cable box, Tivo box, hard drive, DVD player, and home theatre module.

There are two approaches for UWB currently proposed, namely a single band approach and a multi-band approach. The single band approach is less desirable in that it proposes to use the whole 7.5 GHz as one carrier. The multi-band approach segments the 7.5 GHz into equal channels. The basic premise is to use multiple frequency bands to efficiently utilize the UWB spectrum by transmitting multiple UWB signals at the same time. The signals do not interfere with each other because they operate at different frequencies within the UWB spectrum. Each of these signals can be transmitted simultaneously to achieve a very high data rate or can be used as a means of multiple access to allow multiple users to communicate at the same time. Several standard digital modulation techniques can be on each individual UWB signal. The output of the modulated UWB signals can be added together before transmission.

A multi-band UWB system design has a number of advantages including: more scalable and adaptive than single band designs; better co-existence characteristics with systems such as 802.11a; and lower risk implementations because it leverages more traditional radio design techniques. These advantages can be retained while maintaining similar complexity and power consumption levels as single band designs.

With respect to being scalable and adaptive, an advantage of the multi-band approach is that, for example, low bit rate systems can use few bands, high bit rate systems can use many bands. Another advantage is to be potentially adaptive to different radio regulations worldwide, in the event that they do not have the same harmonized spectrum allocations, as happened for the 2.4 GHz and 5 GHz bands used by WiFi and Bluetooth.

With respect to co-existence, another advantage of the multi-band approach is to increase the level of coexistence with other services such as IEEE 802.11a. A receiver can dynamically adjust the in-band interference by removing the affected band, or a transmitter can avoid transmitting in a band already used by another service in close proximity.

Finally, since the multi-band technique is based on well-known wireless communications scheme, modified for use with the UWB spectrum, the technology presents lower implementation risk. This makes multi-band the best candidate for commercial applications that require standards technology and multiple vendors for high volume adoption.

Multi-band systems permit adaptive selection of the bands to provide good interference robustness and co-existence properties. When the system detects the presence of an 802.11a system, for example, it can avoid the use of the bands centered at 5.35 GHz or 5.85 GHz. This same feature can also be utilized to provision for different spectrum allocations outside of the United States; the bands that share the spectrum with extremely sensitive systems can be avoided.

A single band UWB system would need to employ notch filters to achieve the same result. Notch filters are not an ideal solution because they either increase the receiver's noise figure or require higher performance Low Noise Amplifiers. The problem with notch filters is that they are not adaptive and need to be realized with off-chip dedicated hardware. In addition, notch filters in most cases distort the receive pulse and require additional complexity to compensate for this effect.

Figure 4:
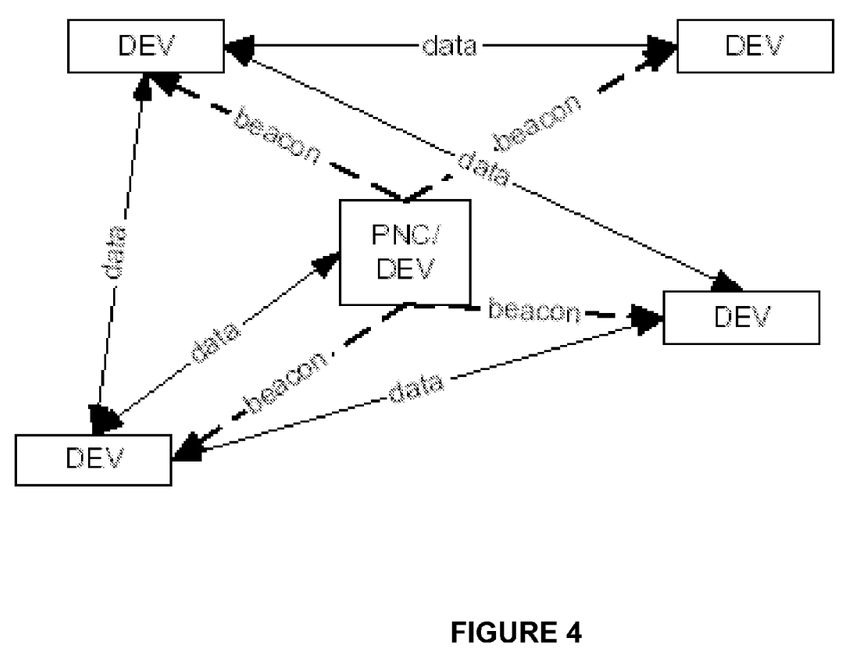
FIG. 4 is a schematic diagram illustrating an exemplary generalized computer networking environment suitable for incorporating embodiments.

The UWB MAC then consists of several components shown in FIG. 4. The basic component is the device or DEV 401. One DEV 403 may assume the role of the piconet coordinator (PNC) of the piconet 400.

The PNC 403 performs the following functionality: provides basic timing for the piconet 400 with the beacon; manages the quality of service (QoS) requirements; manages power save levels; and implements security and access control for the piconet 400. Because a piconet 400 is formed with no pre-planning and for as long as the piconet 400 is needed, this type of operation is referred to as an ad hoc network.

The MAC allows a DEV 401 to request the formation of a subsidiary piconet. The original piconet 400 is referred to as the parent piconet. The subsidiary piconet is referred to as either a child or neighbor piconet, depending on the method the DEV 401 used to associate with the parent PNC 403. Child and neighbor piconets are referred to collectively as dependent piconets since they rely on the parent PNC 403 to allocate channel time for the operation of the dependent piconet. An independent piconet is a piconet that does not have any dependent piconets.

Figure 5:
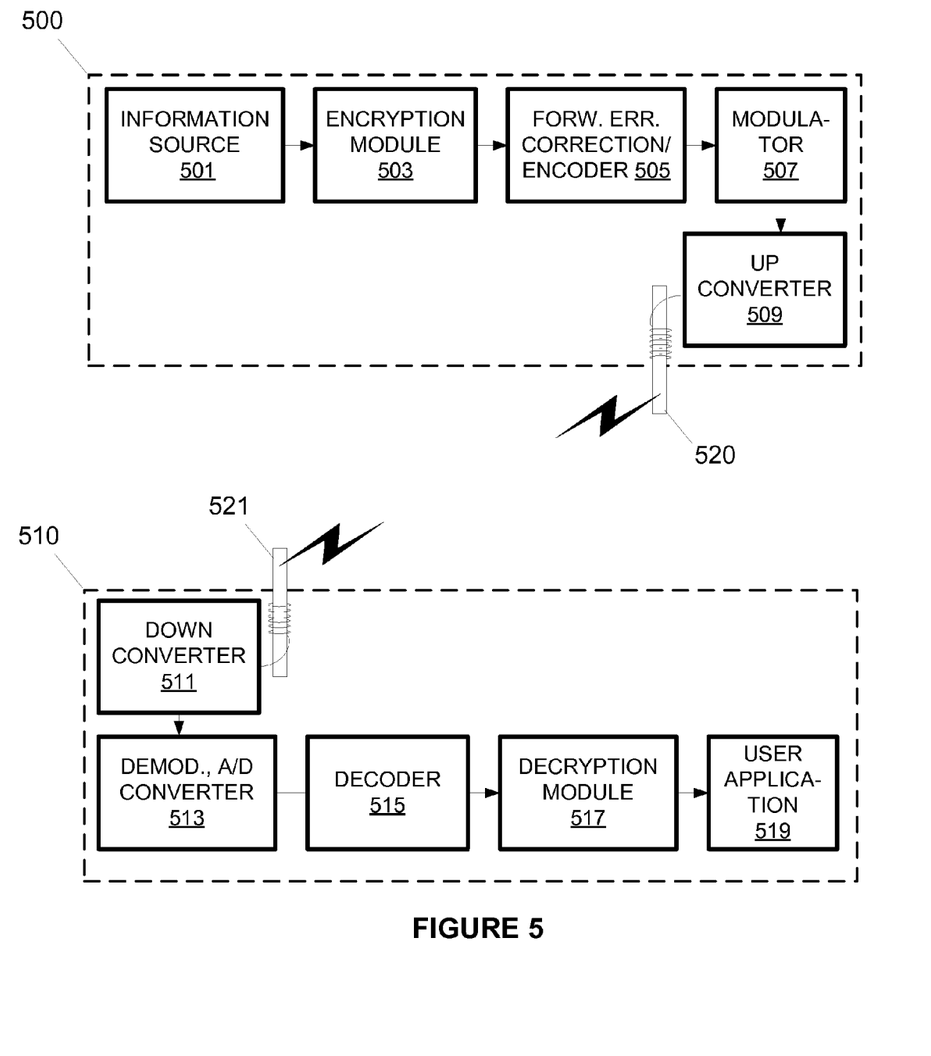
FIG. 5 illustrates a UWB device transmitter and receiver portions in accordance with one or more embodiments.

In one or more embodiments, the UWB device architecture and operation are simplified, at the expense of increased bandwidth usage, in order to decrease device cost, complexity, and processing power consumption. A UWB device in accordance with one or more implementations is illustrated in FIG. 5. A sender UWB device 500 and receiver UWB device 510 are shown. The sender device 500 comprises an information source 501, an encryption module 503, a forward error correction/encoder module 505, a modulator 507, and an up converter 509 linked to an antenna 520. Similarly, the receiving device 510 converter 513, a decoder 515, a decryption module 517, and finally a user application 519. It will be appreciated that devices in accordance with one or more embodiments are capable of both sending and receiving, and thus that a UWB device may include both of the illustrated sections 500, 510.

Of primary interest here is the A/D converter portion 513 of the receiver 510. This portion is responsible for a substantial amount of the complexity and power consumption of the UWB device. For example, consider that one proposal submitted to the IEEE 802.15.3a group for consideration has the following specifications:

| Parameter | Value |
| --- | --- |
| Data rate | 267 Mbps |
| Coding rate | ¾ |
| Effective bit rate | 200 Mbps |
| Bit error rate | 1e-05 |
| Range | 10 m |
| Modulation | BPSK multi-band |
| Frequency of operation | 3.1 GHz-7.1 GHz |
| Number of bands | 8 |
| Sub band center frequency (GHz) | 3.35, 3.85, 4.35, 4.85, 5.35, 5.85, 6.35, 6.85 |
| Sub band bandwidth | 500 MHz |
| Co located piconets | 4 |
| Interference capability | Robust to IEEE 802.11a |
| Co existence capability | Adaptive interference reduction to 802.11a |

The proposal provides for a high data rate of 200 Mbps. Each OFDM signal is composed of 128 sub carriers that are then modulated using, for instance, BPSK, as discussed above. To demodulate the signal, the received RF signal is first down converted to IF, sampled at twice the frequency. That is, there are 500 MHz×2 or 1000 M samples/second or 1 G samples/sec. If each sample is represented by at least two bits, this results in an A/D converter that runs at a minimum of 2 Gbps. Such A/D and resulting fast baseband processing is expensive, and is a primary power drain and heat source.

In one or more embodiments, a lower complexity (and lower heat/lower power) implementation is achieved at the expense of bandwidth. However, bandwidth is relatively plentiful for UWB implementations, since UWB has available 7.5 GHz of bandwidth for unlicensed usage. In particular, in one or more embodiments, the receiver does not use an A/D converter but rather an energy detector to determine what bits were transmitted. The transmitter uses the tone positions themselves for information, rather than the phase of a signal. For example, if the transmitter and receiver use the 128 tones in the 500 MHz band, then each tone position represent 7 bits of information. If on the other hand 4 bands, for instance, are used for transmission, this implies 512 sub carriers and the position of each tone signifies 9 bits. In any event the transmitter performs an IFFT prior to up converting the signal for transmission. The positions can also be used with redundancy with error protection coding. In one or more embodiments, the receiver acts as a spectrum analyzer. It performs an FFT, or just tunes to energy levels in the band. The tone with highest energy band will be decoded for bits. Assume there are 128 sub carriers in an OFMD signal. There are 128 energy outputs. The demodulator selects the output with highest value and decodes the corresponding bits.

Figure 6:
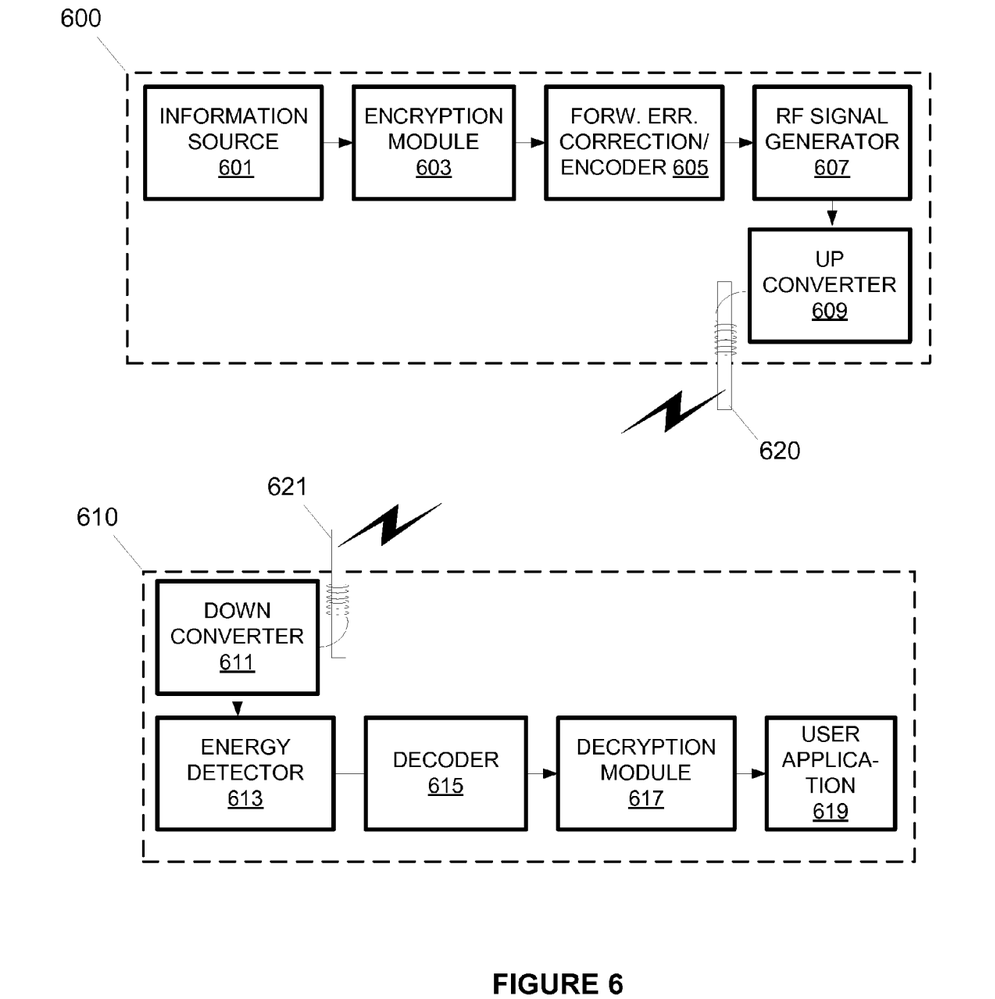
FIG. 6 illustrates a UWB transmitter and receiver according to one or more embodiments.

A schematic view of a UWB transmitter and receiver according to one or more embodiments is shown in FIG. 6. As in the traditional case, the transmitter 600 comprises an information source 601, an encryption module 603, a forward error correction/encoder module 605, a modulator 607, and an up converter 609 linked to an antenna 620. However, the modulator 607 is a simple RF signal generator in accordance with one or more embodiments. The receiver 610 comprises an antenna 621 linked to a down converter 611, an energy detector 613 (i.e. no A/D conversion is necessary), a decoder 615, a decryption module 617, and finally a user application 619. As noted, using the scheme outlined above, the transmitter's modulator 613 is now a simple RF signal generator, and the receiver's demodulator and A/D converter 513 has been replaced with a simple energy detector 613.

This change, and in particular the replacement of the A/D converter with a simple energy detector, serves to greatly decrease the complexity and power consumption of the UWB device, while also minimizing heat generation. The following will describe several simplified examples of the energy detection coding according to one or more embodiments for the reader's ease of understanding.

Figure 7A:
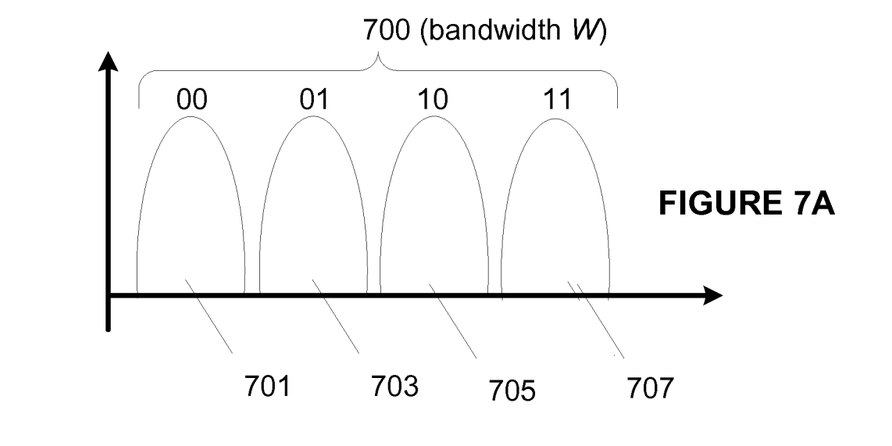
FIG. 7A illustrates a simplified schematic frequency diagram illustrating a data encoding method for UWB according to one or more embodiments.

FIG. 7A shows a simplified schematic frequency diagram illustrating a data encoding method for UWB according to one or more embodiments. A portion 700 of the UWB spectrum of width W is shown. The spectral portion 700 is subdivided into 4 subbands 701, 703, 705, 707, each having a width of W/4. The presence or absence of energy in each subband is utilized to signify particular values in a binary manner. Each subband signifies a particular binary number. As illustrated, the first subband 701 corresponds to "00," the second subband 703 corresponds to "01," the third subband 705 corresponds to "10," and the fourth subband 707 corresponds to "11."

Figure 7B:
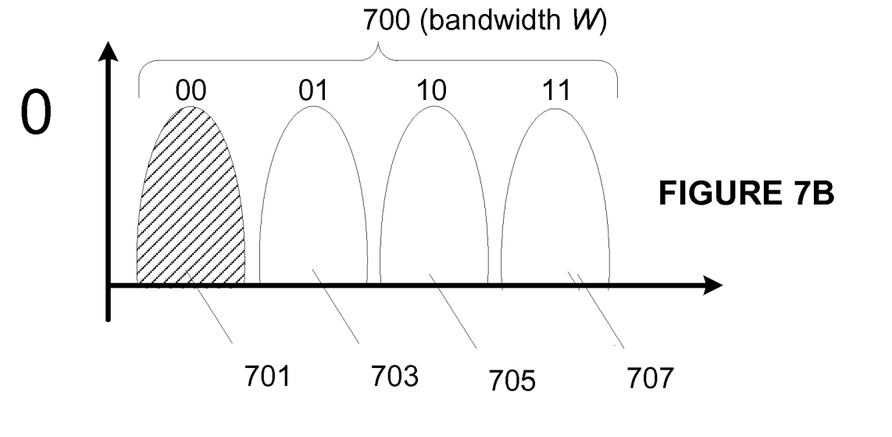
FIG. 7B illustrates a simplified schematic frequency diagram illustrating a data encoding method for UWB according to one or more embodiments, wherein a "0" is encoded.
Figure 7C:
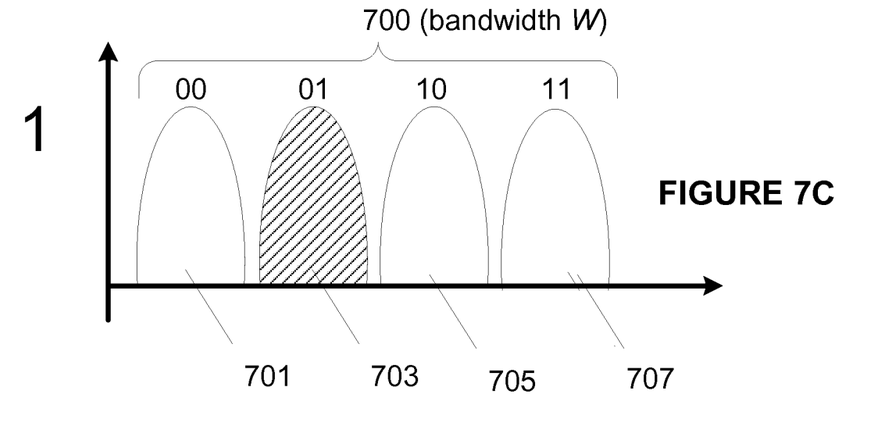
FIG. 7C illustrates a simplified schematic frequency diagram illustrating a data encoding method for UWB according to one or more embodiments, wherein a "1" is encoded.
Figure 7D:
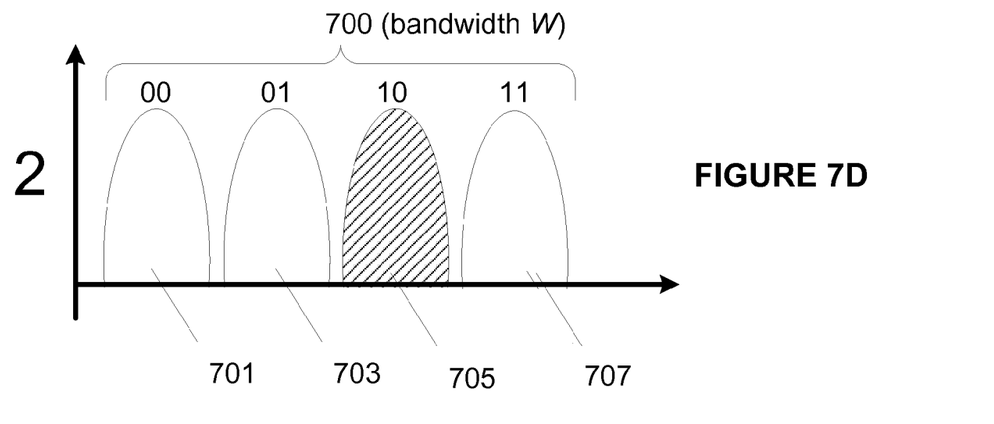
FIG. 7D illustrates a simplified schematic frequency diagram illustrating a data encoding method for UWB according to one or more embodiments, wherein a "2" is encoded.
Figure 7E:
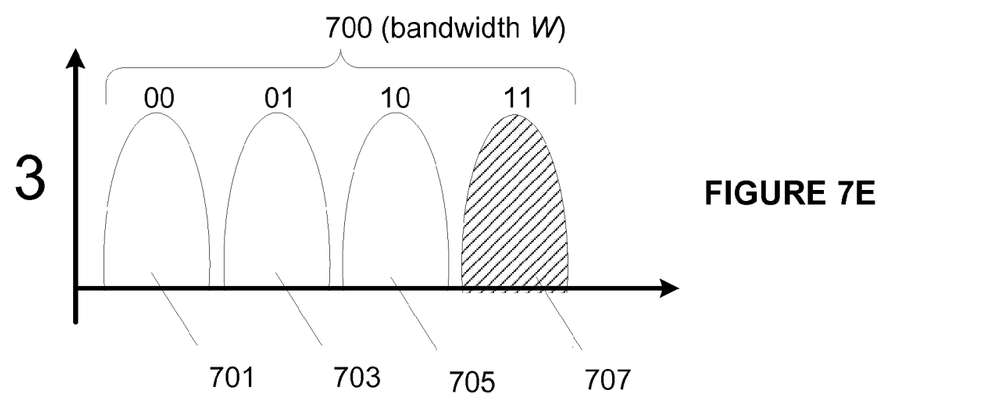
FIG. 7E illustrates a simplified schematic frequency diagram illustrating a data encoding method for UWB according to one or more embodiments, wherein a "3" is encoded.
Figure 7F:
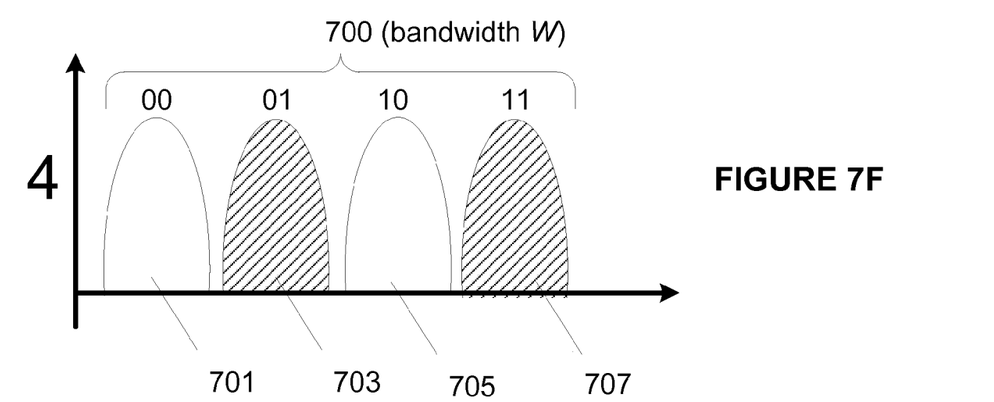
FIG. 7F illustrates a simplified schematic frequency diagram illustrating a data encoding method for UWB according to one or more embodiments, wherein a "4" is encoded.
Figure 7G:
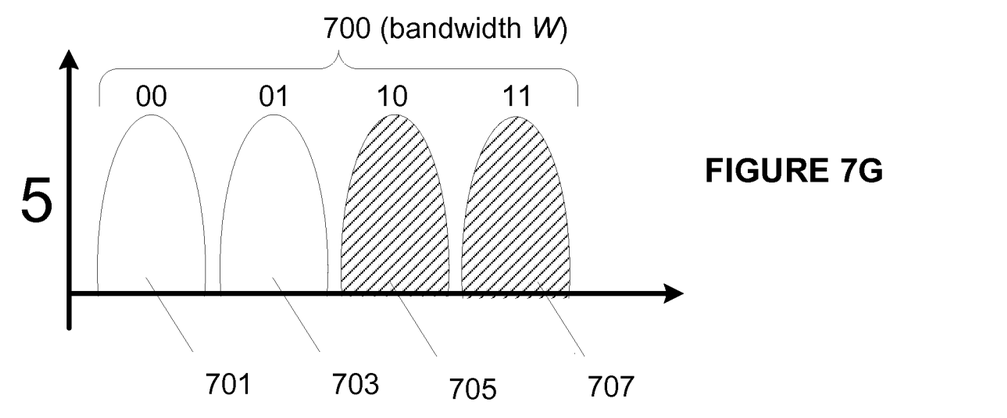
FIG. 7G illustrates a simplified schematic frequency diagram illustrating a data encoding method for UWB according to one or more embodiments, wherein a "5" is encoded.
Figure 7H:
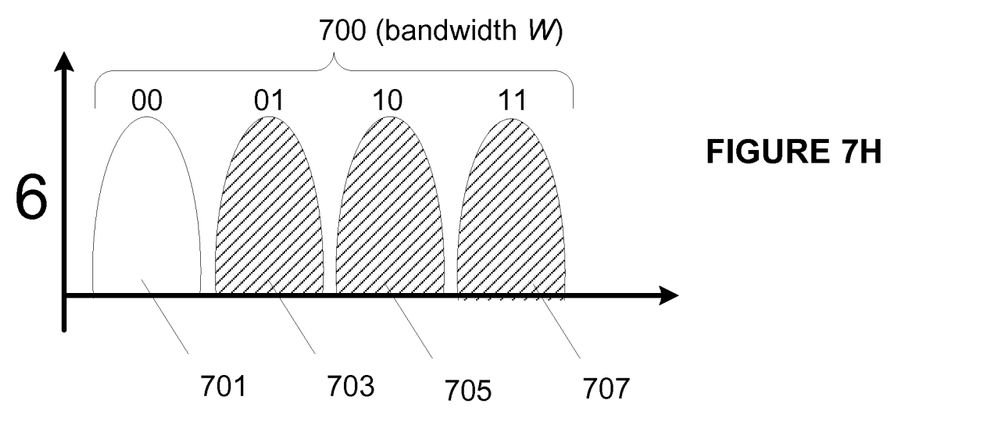
FIG. 7H illustrates a simplified schematic frequency diagram illustrating a data encoding method for UWB according to one or more embodiments, wherein a "6" is encoded.

FIGS. 7G-7H shows the manner in which values of 0 through 6 are coded respectively. Thus, FIG. 7B illustrates the coding of "00" (i.e. 0) by transmission of energy in the first subband 701 and no other. FIG. 7C illustrates the coding of "01" (i.e. 1) by transmission of energy in the second subband 703 and no other. FIG. 7D illustrates the coding of "10" (i.e. 2) by transmission of energy in the third subband 705 and no other. FIG. 7E illustrates the coding of "11" (i.e. 3) by transmission of energy in the fourth subband 707 and no other. FIG. 7F illustrates the coding of "11+01" (i.e. 4) by transmission of energy in the second 703 and fourth 707 subbands and no other. FIG. 7G illustrates the coding of "11+10" (i.e. 5) by transmission of energy in the third 705 and fourth 707 subbands and no other. FIG. 7H illustrates the coding of "11+01+10" (i.e. 6) by transmission of energy in the second 703, third 705, and fourth 707 subbands and no other.

It will be appreciated that the range of values to be coded will be established by setting the number of subbands as well as the value assigned to each subband. In the example above, the use of 4 subbands, each of which coded two bits, yielded the ability to encode values from 0 to 6 in the band at any given moment. Similarly, the use of 8 subbands, each encoding 3 bits, would allow the encoding in the band of values up to 28 (000+001+010+011+100+101+110+111). Note that the signal may still be an OFDM signal. Thus, the device can be adaptable to use either ordinary BPSK coding or the energy coding described herein.

In one or more embodiments, a UWB device selects a transmission mode, e.g., ordinary BPSK or energy coding, based on the known capabilities of the receiver. For example, if the receiver is a complex device supporting 2 Gbps analog-to-digital conversion, then the transmitter may encode the data to be sent using BPSK. On the other hand, if the device is less sophisticated, and does not support A/D (or sufficient A/D), then the transmitter may encode the data to be sent using energy encoding.

Figure 8:
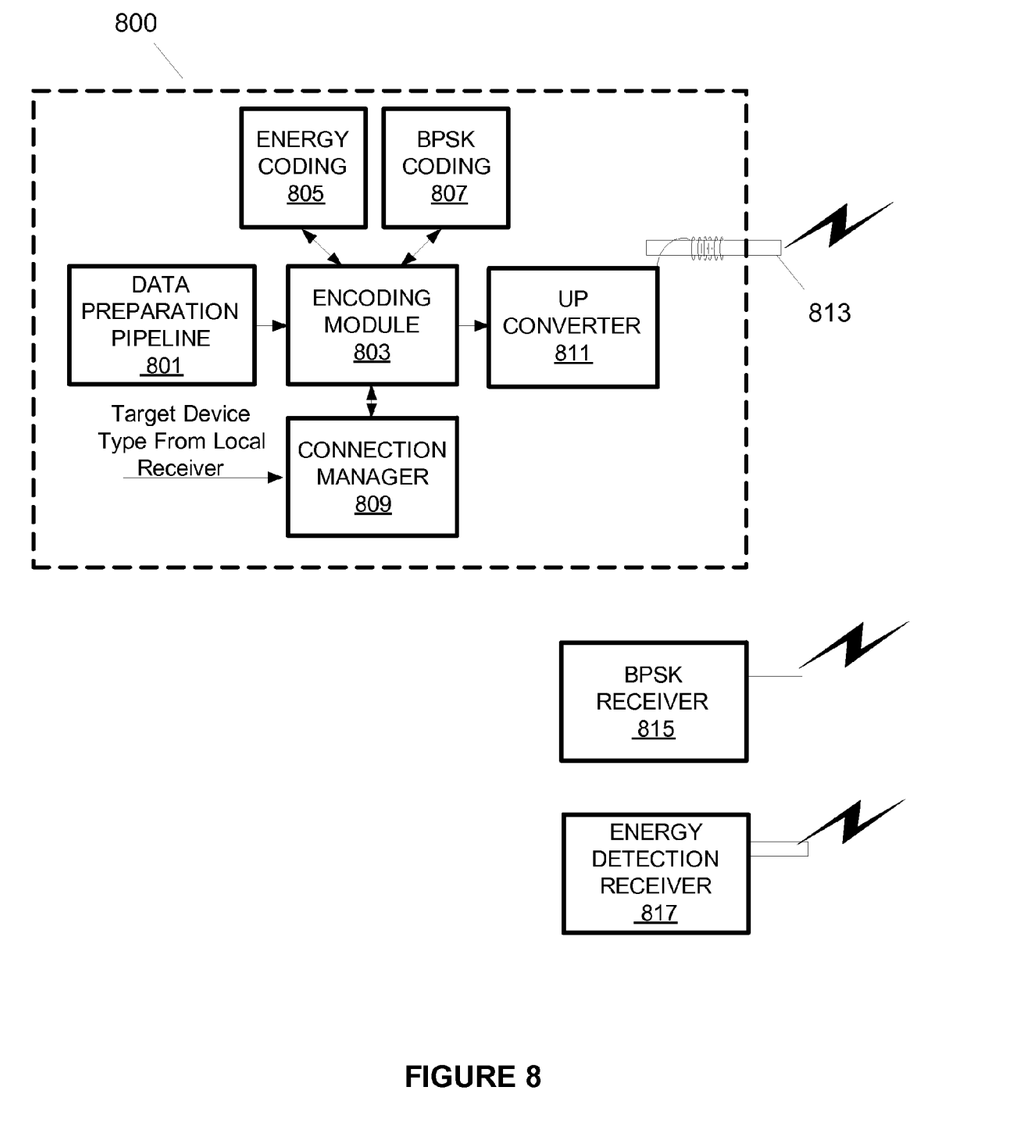
FIG. 8 illustrates an example architecture for a UWB transmitter portion according to one or more embodiments in an environment including a receiver according to one or more embodiments and an ordinary receiver.

FIG. 8 illustrates an exemplary architecture for a UWB transmitter portion according to one or more embodiments in an environment including a receiver according to one or more embodiments and an ordinary receiver. The transmitter portion 800 comprises a data preparation pipeline 801 (e.g., including information source, encryption, etc.), an encoding module 803, and an up converter 811 linked to an antenna 813 for transmission. The encoding module 803 utilizes either an energy coding module 805 or a BPSK coding module 807. Which module 805, 807 is used is determined by a connection manager 809 based on what receiver type is being addressed. The connection manager 809 received data from the local device receiver indicating the type of the target device. This information may be contained in a beacon or management slot of an incoming UWB transmission during connection. If the target device has an energy detection receiver, or has multiple receiver types but is currently using an energy detection receiver, then the connection manager 809 instructs the encoding module 803 to use the energy coding module 805. Otherwise, the connection manager instructs the encoding module 803 to use the BPSK coding module 807.

As noted above, a device may have multiple types of receivers. In this case, the device may choose to use a particular receiver type based on the environment and/or its remaining battery capacity. For example, in the illustrated environment of FIG. 8, device 800 has an energy detection transmitter and device 817 is using an energy detection receiver. In this environment, although device 815 has a BPSK receiver, it may wish to increase network efficiency by using an energy detection receiver if it has one. In addition to internally switching to such a receiver, device 815 may also inform the other network nodes of its receiver type in use.

Figure 10:
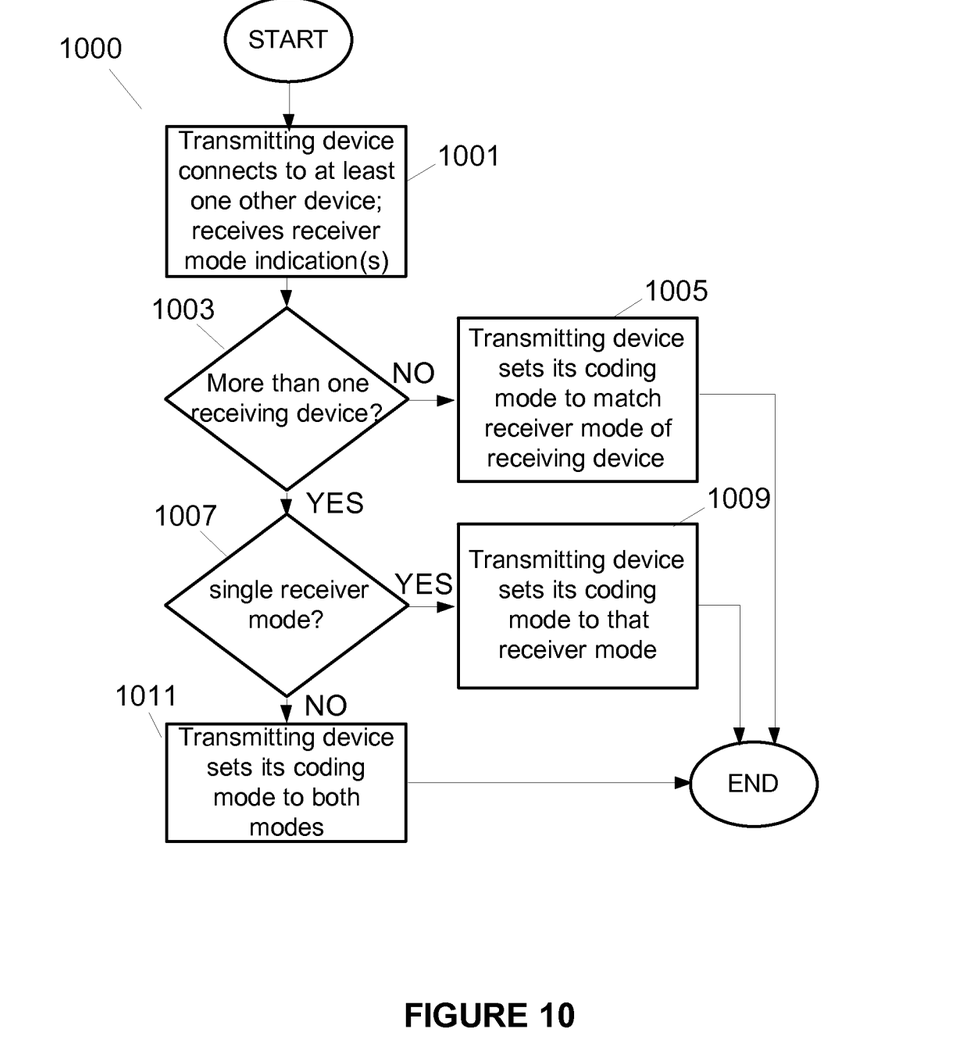
FIG. 10 is a flowchart of a process of selecting a coding mode for a transmitting UWB device in accordance with one or more embodiments.

FIG. 10 illustrates in flow chart form a process of selecting a coding mode for a transmitting UWB device in accordance with one or more embodiments. It will be appreciated that the illustrated process is merely an example, and that there are other processes by which this and other objectives within the scope of one or more embodiments may be accomplished. At step 1001 of the flow chart 1000, a device intending to transmit in the UWB spectrum to at least one other UWB devices connects to the at least one other device. In this process, the transmitter receives from the at least one other device its receiver mode, e.g., BPSK (phase) or Energy (energy coding in subbands as discussed above). At step 1003, the transmitting device determines whether the one or more other devices are a plurality of devices. If the one or more other devices comprise only a single device, the transmitting device sets its coding mode to the receiver mode of that device in step 1005. If, on the other hand, the one or more other devices comprises a plurality of devices, then at step 1007, the transmitting device determines whether that plurality of devices uses a single receiver mode. If so, the transmitting device sets its coding mode to that mode in step 1009. Otherwise, the transmitting device sets its coding mode to both modes in step 1011. In this configuration, the different code types could be sent sequentially at the expense of bandwidth.

Although one or more embodiments may be used in conjunction with networks formed from a wide array of device types possibly but not necessarily including a traditional PC or laptop computer, a description of one type of computer in which various embodiments may be practiced is now provided. Although not required, one or more embodiments will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. One or more embodiments may also be employed in distributed computing environments, where tasks are performed by remote processing devices that are linked through a communications network. In a distributed computing environment, programs may be located in both local and remote memory storage devices.

Figure 9:
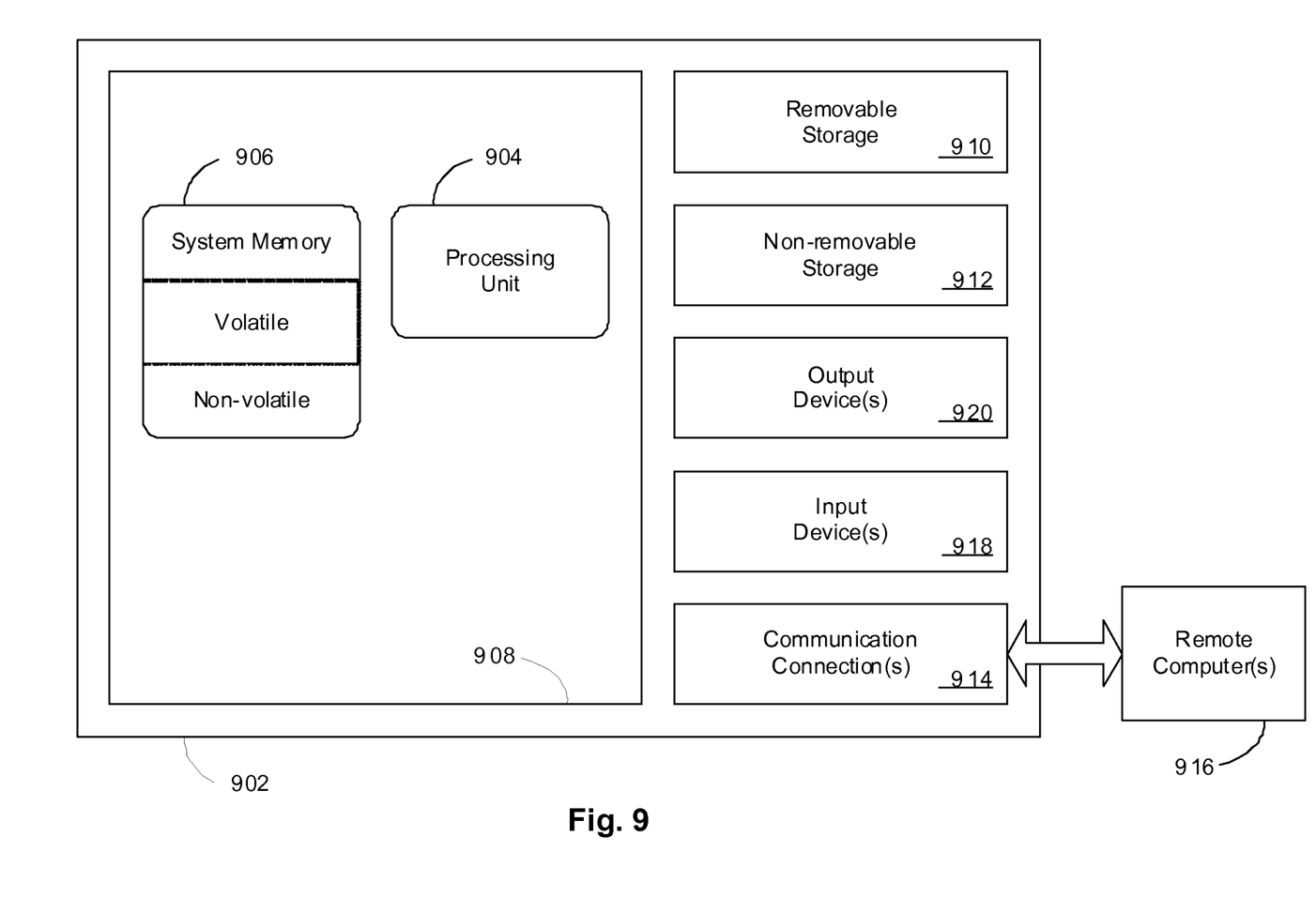
FIG. 9 is an example of a computer configuration on which aspects of one or more embodiments may be implemented in accordance with one or more embodiments.

Referring to FIG. 9, an example of a basic configuration for the computer 902 on which aspects of one or more embodiments described herein may be implemented is shown. In its most basic configuration, the computer 902 may include at least one processing unit 904 and memory 906. The processing unit 904 executes instructions to carry out tasks in accordance with various embodiments. In carrying out such tasks, the processing unit 904 may transmit electronic signals to other parts of the computer 902 and to devices outside of the computer 902 to cause some result. Depending on the exact configuration and type of the computer 902, the memory 906 may be volatile (such as RAM), non-volatile (such as ROM or flash memory) or some combination of the two. This most basic configuration is illustrated in FIG. 9 by dashed line 908.

The computer 902 may also have additional features/functionality. For example, computer 902 may also include additional storage (removable 910 and/or non-removable 912) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to store the desired information and which can be accessed by the computer 902. Any such computer storage media may be part of computer 902.

The computer 902 may also contain communications connections 914 that allow the device to communicate with other devices such as remote computer(s) 916. A communication connection is an example of a communication medium. Communication media embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 902 may also have input devices 918 such as a keyboard/keypad, mouse, pen, voice input device, touch input device, etc. Output devices 920 such as a display, speakers, a printer, etc. may also be included. All these devices are well known in the art and need not be described at length here.

While the description herein has focused up to this point on UWB and its implementation, it will be appreciated that the principles of one or more embodiments are also applicable to other wideband technologies. For example, embodiments are applicable to WiMax and other similar technologies. WiMax is a wireless technology that provides broadband connections over relatively long distances. WiMax implements the IEEE 802.16 standard. It provides metropolitan area network connectivity over distances as far as 30 miles, although the transmission link may be three to five miles.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing one or more embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed embodiments and does not pose a limitation on the scope of the discussed embodiments unless otherwise claimed. No language in the specification should be construed as indicating any non-claimed element as essential to the practice of one or more embodiments.

One or more embodiments are described herein, including the best mode known for carrying out the claimed embodiments. Variations of embodiments may become apparent to those of ordinary skill in the art upon reading the foregoing description. It is expected that skilled artisans will employ such variations as appropriate, and it is intended for one or more embodiments to be practiced otherwise than as specifically described herein. Accordingly, embodiments include all modifications and equivalents of the subject matter recited in the claims appended hereto as permitted by applicable law. Moreover, any combination of the above-described elements in all possible variations thereof is encompassed by one or more embodiments unless otherwise indicated herein or otherwise clearly contradicted by context.

What is claimed is:

1. One or more hardware computer-readable storage media storing instructions that are executable by a device to cause the device to encode a data value for transmission by performing operations comprising:

assigning each of different binary values to a different frequency subband of a plurality of frequency subbands in a frequency bandwidth; and applying energy at one particular point in time to two or more of the frequency subbands to generate a plurality of the different binary values having a sum that corresponds to the data value, the data value being selected from a number of possible data values that is greater than a number of the frequency subbands in the frequency bandwidth.

2. The one or more hardware computer-readable storage media of claim 1, wherein the operations further comprise causing the device to encode the data value for transmission to a different device in response to receiving an indication that a receiver mode of the different device is set to receive energy coding in frequency subbands.

3. The one or more hardware computer-readable storage media of claim 1, wherein the operations further comprise causing the device to encode the data value for transmission to a different device in response to receiving an indication that a receiver of the different device does not support analog-to-digital (A/D) conversion.

4. The one or more hardware computer-readable storage media of claim 1, wherein applying the energy at the particular point in time to the one or more of the frequency subbands causes an encoded version of the data value to be transmitted for receipt by a different device.

5. The one or more hardware computer-readable storage media of claim 4, wherein the operations further comprise causing the device to transmit the encoded version of the data value via a radio frequency (RF) signal generator.

6. The one or more hardware computer-readable storage media of claim 4, wherein the operations further comprise causing the device to transmit the encoded version of the data value via orthogonal frequency-division multiplexing (OFDM).

7. The one or more hardware computer-readable storage media of claim 4, wherein the operations further comprise causing the device to transmit the encoded version of the data value for receipt by the different device responsive to receiving an indication of a remaining battery capacity of the different device.

8. The one or more hardware computer-readable storage media of claim 1, wherein applying the energy at the particular point in time to the one or more of the frequency subbands causes an encoded version of the data value to be generated, and wherein the operations further comprise causing the device to transmit the encoded version of the data value and transmit the data value via binary phase-shift keying (BPSK).

9. A computer-implemented method, comprising:

determining that a receiving mode for a first device is different than a receiving mode for a second device;

setting a coding mode for a transmitting device to transmit a particular portion of data via both the receiving mode for the first device and the receiving mode for the second device; and assigning, for one of the receiving mode for the first device or the receiving mode for the second device, each of different binary values to a different frequency subband of a plurality of subbands in a frequency bandwidth within which the particular portion of data is to be transmitted, the different binary values being usable to encode a data value selected from a number of possible data values that is greater than a number of the frequency subbands in the frequency bandwidth, at least one of the possible data values being based on an application of energy to two or more of the plurality of frequency subbands at one particular point in time.

10. The computer-implemented method of claim 9, wherein the receiving mode for the first device comprises binary phase-shift keying (BPSK) and the receiving mode for the second device comprises energy coding in frequency subbands.

11. The computer-implemented method of claim 9, further comprising transmitting the particular portion of data via the receiving mode for the first device and the receiving mode for the second device sequentially.

12. The computer-implemented method of claim 9, further comprising:
generating an encoded version of the particular portion of data by applying energy at a particular point in time to one or more of the frequency subbands to generate one or more of the different binary values that correspond to the particular portion of data.

13. The computer-implemented method of claim 12, further comprising transmitting the encoded version of the particular portion of data via orthogonal frequency-division multiplexing (OFDM) for receipt by one or more of the first device or the second device.

14. The computer-implemented method of claim 12, wherein the encoded version of the particular portion of data is generated in response to determining that the coding mode corresponding to the receiving mode for the first device or the coding mode corresponding to the receiving mode for the second device comprises energy encoding in frequency subbands.

15. A computer-implemented method, comprising:
receiving a transmission of energy at one particular point in time and determining frequency subbands in which the transmission of energy is transmitted; and
decoding a data value by determining each of different binary values that are assigned to each of the frequency subbands, the different binary values corresponding to the data value, the data value being selected from a number of possible data values that is greater than a number of determined frequency subbands, and at least one of the possible values being based on which plurality of the frequency subbands include the transmission of energy at the one particular point in time.

16. The computer-implemented method of claim 15, wherein the transmission of energy is received in response to transmitting an indication that a coding mode for a device that receives the transmission of energy supports energy coding in frequency subbands.

17. The computer-implemented method of claim 15, wherein the frequency subbands are determined via one or more of performing a fast Fourier transform (FFT) on the transmission of energy or tuning to energy levels of the transmission of energy.

18. The computer-implemented method of claim 15, wherein said receiving and said decoding are implemented via a device, and wherein a receiver mode of the device is determined based on a remaining battery capacity of the device.

19. The computer-implemented method of claim 15, wherein said receiving and said decoding are implemented via a device that is configured to be switchable between multiple receiver modes.

20. The computer-implemented method of claim 15, wherein the different binary values are determined via an energy detector and independent of analog-to-digital (A/D) conversion.

* * * * *